United States Patent
Sensui

(12) 
(10) Patent No.: US 6,297,909 B1
(45) Date of Patent: Oct. 2, 2001

(54) FOCUS DETECTING OPTICAL SYSTEM

(75) Inventor: Takayuki Sensui, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/453,035

(22) Filed: Dec. 2, 1999

(30) Foreign Application Priority Data

Dec. 9, 1998 (JP) .................................................. 10-350386

(51) Int. Cl.[7] .......................... G02D 27/10; G03D 13/00; G03D 19/12
(52) U.S. Cl. ........................... 359/618; 396/111; 396/358
(58) Field of Search .................................. 359/618, 629; 396/111, 113, 114, 119, 358, 447

(56) References Cited

U.S. PATENT DOCUMENTS

| | | | | |
|---|---|---|---|---|
| 4,841,326 | * | 6/1989 | Koyama | 354/406 |
| 5,212,514 | * | 5/1993 | Goto | 354/402 |
| 5,296,888 | * | 3/1994 | Yamada | 354/402 |
| 5,771,413 | * | 6/1998 | Suda | 396/114 |
| 5,835,797 | * | 11/1998 | Odaka | 396/51 |
| 5,839,001 | | 11/1998 | Ohtaka et al. | 396/114 |

FOREIGN PATENT DOCUMENTS 9184965    7/1997 (JP) .

\* cited by examiner

*Primary Examiner*—Georgia Epps
*Assistant Examiner*—Gary O'Neiil
(74) *Attorney, Agent, or Firm*—Greenblum & Bernstein, P.L.C.

(57) ABSTRACT

A focus detecting optical system includes a reduction lens having a positive refractive power that is located between an objective lens and an image taking plane on which a primary image of a subject is formed by the objective lens, a separation plane mirror for separating a light passed through the reduction lens from an optical path toward the image taking plane, a pair of separator lenses for re-forming an image formed through the reduction lens and the separation plane mirror into a pair of secondary images, and a pair of image sensors for capturing the secondary images. The optical axis of the reduction lens is coaxial with the optical axis of the objective lens.

4 Claims, 6 Drawing Sheets

PRIOR ART

FOCUS DETECTING OPTICAL SYSTEM

BACKGROUND OF THE INVENTION

The present invention relates to a focus detecting optical system that is installed in a film camera or a video camera that exposes or captures a subject image formed by an objective lens for detecting a focusing condition of the objective lens with respect to the subject to be taken.

An autofocus single lens reflex camera is provided with a focus detecting optical system. FIG. 5 shows an optical system of a conventional single lens reflex camera. Light from a subject of a photograph is incident on an taking lens 1, a major portion of the incident light is reflected by a main mirror 2 to form an image of the subject on a focusing screen 3. A user observes the image of the subject via an eyepiece lens 4 and a pentagonal prism 5 that constitute a finder optical system.

The main mirror 2 is provided with a half mirror portion in the center thereof. The transmitted light through the half mirror portion of the main mirror 2 is reflected by a sub mirror 6 toward a focus detecting unit 8.

The main mirror 2 and the sub mirror 6 move to the side out of the optical path such that an image of the subject is formed on a film 9 at the time of the exposure.

The conventional focus detecting unit 8 includes, as shown in FIG. 6, a field mask 8a, a condenser lens 8b, a separator mask 8g, a pair of separator lenses 8c and 8d, and a pair of line sensors 8e and 8f that are arranged in this order from the side of the sub mirror 6. The field mask 8a is substantially coincident with an equivalent film plane F on which a primary image of the subject is formed through the taking lens 1. The separator mask 8g has a pair of openings to limit the light to be incident on the separator lenses 8c and 8d. The separator lenses 8c and 8d re-form the primary image into a pair of secondary images. The line sensors 8e and 8f capture the secondary images.

The positional relationship between the secondary images formed on the line sensors 8e and 8f varies in accordance with the focusing condition of the taking lens 1 with respect to the subject. Therefore, the focusing condition can be detected on the basis of the relationship that is calculated from outputs of the line sensors 8e and 8f.

However, since the conventional focus detecting unit 8 detects the focusing condition of the taking lens only at the center of the taking area, it cannot meet requirement of users to detect the focusing condition of the taking lens with respect to a subject at any point in the taking area.

In order to meet the requirement, the focus detecting optical system must be provided with area sensors as image sensors and must expand the range of the light taken into the focus detecting unit 8. However, since the expansion of the range of the taken light with the above descried optical system increases the sizes of the sub mirror 6 and the condenser lens 8b, it is hard to install such a focus detecting optical system in a limited space of the single lens reflex camera.

The focus detecting optical system disclosed in the Japanese Patent Provisional Publication No. Hei 9-184965 uses area sensors to enable focus detection at any chosen point in the taking area and a concave mirror as the sub mirror to expand the range of the taken light without upsizing of the focus detecting optical system.

However, the convergent mirror is tilted with respect to the optical axis in the optical system disclosed in the publication, which causes distortions in the secondary images. This may cause a mismatch between the intended focus detecting point in the taking area and the actual detecting point on the area sensor, which may obstruct the accurate focus detection with respect to the intended subject.

SUMMARY OF THE INVENTION

It is therefore an object of the present invention to provide an improved focus detecting optical system, which is capable of accurately detecting a focusing condition of an objective lens with respect to an intended subject without upsizing of the device even if an area sensor is used to enable focus detection at any chosen point in the taking area.

For the above object, according to the present invention, there is provided a focus detecting optical system, which includes a reduction lens having a positive refractive power that is located between an objective lens and an image taking plane on which a primary image of a subject is formed by the objective lens, a separation plane mirror for separating light passed through the reduction lens from an optical path toward the image taking plane, a pair of separator lenses for re-forming a primary image formed through the reduction lens and the separation plane mirror into a pair of secondary images, and a pair of image sensors for capturing the secondary images. The optical axis of the reduction lens is coaxial with the optical axis of the objective lens.

With this construction, the light passing through the objective lens is converged by the reduction lens to be incident on the separator lenses, which expands the range of the light taken by the focus detecting optical system without upsizing the separation plane mirror, the separator lenses nor the image sensors. Further, the optical axes of the objective lens and the reduction lens are coaxial to each other and the separation mirror is a plane mirror, which does not distort the secondary images.

It is preferable that the reduction lens has a refractive power to make an exit pupil of the objective lens be optically conjugate with entrance pupils of the separator lenses.

The image sensors may be area sensors in which pixels are two-dimensionally arranged. Each area sensor may consist of a plurality of line sensors whose pixels are linearly arranged. In such a case, the line sensors are arranged in parallel at predetermined intervals.

The focus detecting optical system of the present invention can be applied to a single lens reflex camera. In such a case, the objective lens is a taking lens, and the reduction lens is located on the side of the image taking plane with respect to a main mirror that reflects a light passing through the taking lens toward a finder optical system.

DESCRIPTION OF THE ACCOMPANYING DRAWINGS

DESCRIPTION OF THE EMBODIMENTS

Figure 1:
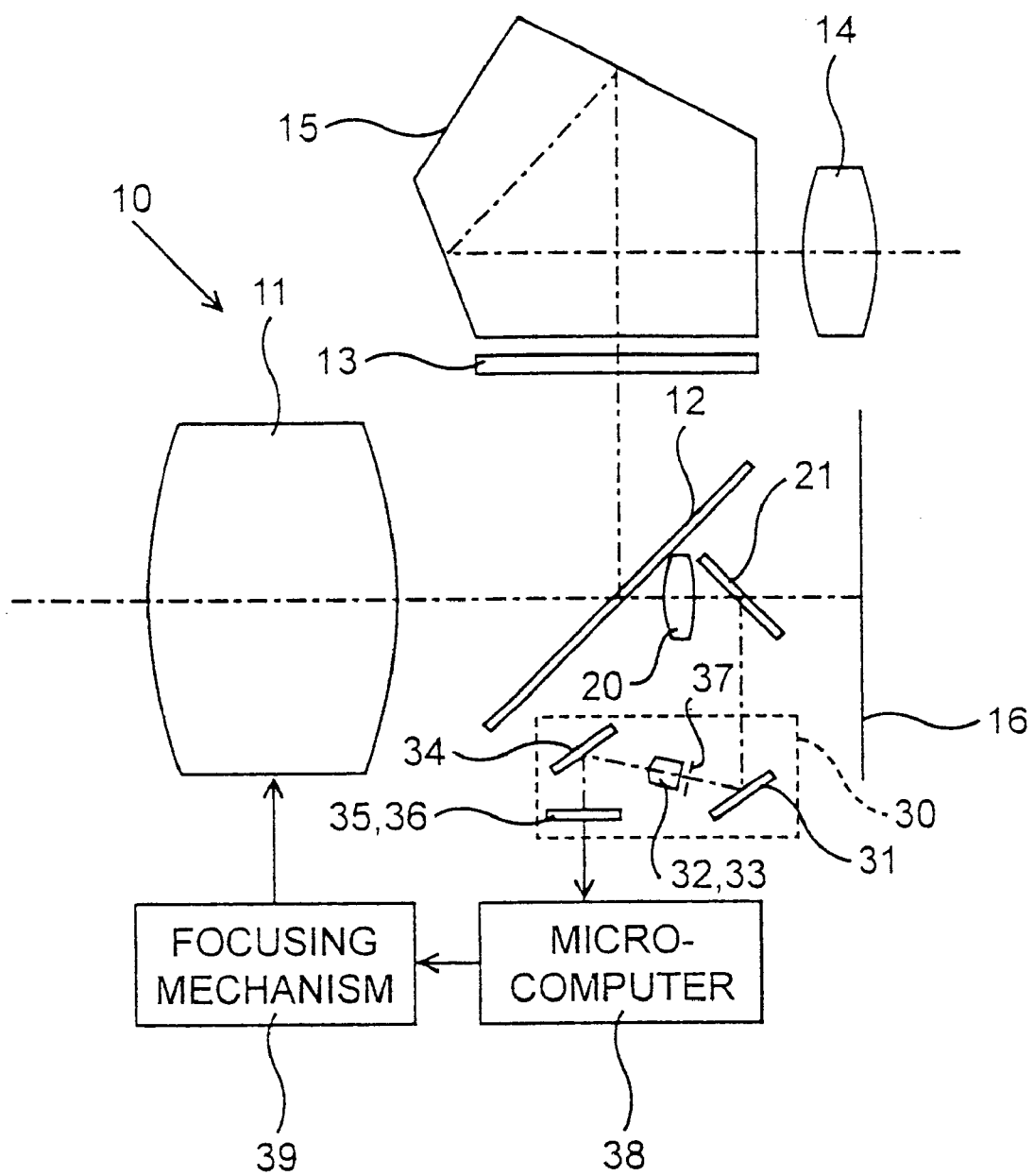
FIG. 1 shows an optical system of a single lens reflex camera that employs a focus detecting optical system according to an embodiment.

An embodiment of the present invention will be described with reference to the drawings. FIG. 1 shows an optical system of an autofocus single lens reflex camera 10 that employs a focus detecting optical system according to the embodiment.

The single lens reflex camera 10 includes a taking lens 11 as an objective lens to form an image of a subject of a photograph, a main mirror 12 that reflects the incident light through the taking lens 11 toward a finder optical system that consists of a focusing screen 13, an eyepiece lens 14 and a pentagonal prism 15. The camera 10 is further provided with a reduction lens 20, a separation plane mirror (sub mirror) 21 and a focus detecting unit 30.

A major portion of the incident light through the taking lens 11 is reflected by a main mirror 12 to form an image of the subject on a focusing screen 13. A user observes the image of the subject via the eyepiece lens 14 and the pentagonal prism 15.

The main mirror 12 is provided with a half mirror portion in the center thereof. The transmitted light through the half mirror portion of the main mirror 12 is converged by the reduction lens 20 and is reflected downward in FIG. 1 by the separation plane mirror 21, i.e., toward the focus detecting unit 30. The focus detecting optical system includes the reduction lens 20, the separation plane mirror 21 and the focus detecting unit 30.

The main mirror 12, the reduction lens 20 and the separation plane mirror 21 move to the side out of the optical path such that an image of the subject is formed on a film (an image taking plane) 16 at the time of the exposure.

The reduction lens 20 is located between the taking lens 11 and the film 16 and the optical axis of the reduction lens 20 is coaxial with the optical axis of the taking lens 11. The separation plane mirror 21 has a function to separate a light passed through the reduction lens 20 from an optical path toward the film 16. The presence of the reduction lens 20 brings an equivalent film plane F in a focus detecting optical system close to the taking lens 11 as compared with a primary image formed by the taking lens 11 alone. This expands the range of the light taken by the focus detecting unit 30 without upsizing the optical elements in the focus detecting optical system.

Incidentally, the focal length of the reduction lens 20 is preferably set at about 30 mm when the focus detecting optical system of the embodiment is applied to a 35 mm format (Leica format) single lens reflex camera whose flange back is about 45 mm.

The focus detecting unit 30 is provided with a first mirror 31 that reflects the light reflected by the separation plane mirror 21 in the direction toward the taking lens 11, a pair of separator lenses 32 and 33, a second mirror 34 that reflects the light from the separator lenses downward in FIG. 1, and a pair of area sensors 35 and 36. A separator mask 37, which has a pair of openings to limit the light to be incident on the separator lenses 32 and 33, is disposed between the first mirror 31 and the separator lenses 32 and 33.

Outputs from the area sensors 35 and 36 are entered into a microcomputer 38. The microcomputer 38 calculates the focusing condition of the taking lens 11 with respect to the intended subject. In general, the taking lens 11 consists of a plurality of lens groups and at least one lens group is a focusing lens group that is driven along the optical axis to change focusing condition. A focusing mechanism 39 includes a motor to drive the focusing lens group of the taking lens 11. The microcomputer 38 controls the focusing mechanism 39 according to the result of the calculation to move the focusing lens group at an in-focus position.

Figure 2:
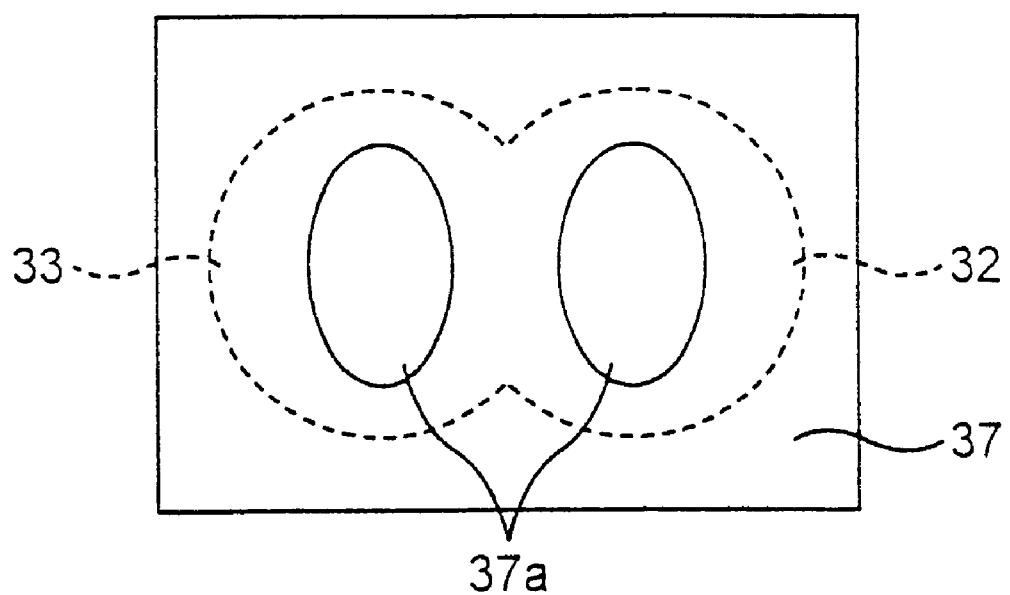
FIG. 2 is a front view of a separator mask and separator lenses of the focus detecting optical system of FIG. 1.

FIG. 2 shows the separator mask 37 and the separator lenses 32 and 33 viewed from the first mirror 31 side. The separator lenses 32 and 33 are connected to each other to form a single body as shown by a dashed line in FIG. 2. The light that forms the primary image passes through the openings 37a of the separator mask 37 to be incident on the separator lenses 32 and 33. The separator lenses 32 and 33 re-form the primary image into a pair of secondary images of the subject.

It should be noted that the direction of a line that links the optical axes of the separator lenses 32 and 33 in a plane perpendicular to the optical axes is defined as a dividing direction of the separator lenses 32 and 33.

Figure 3:
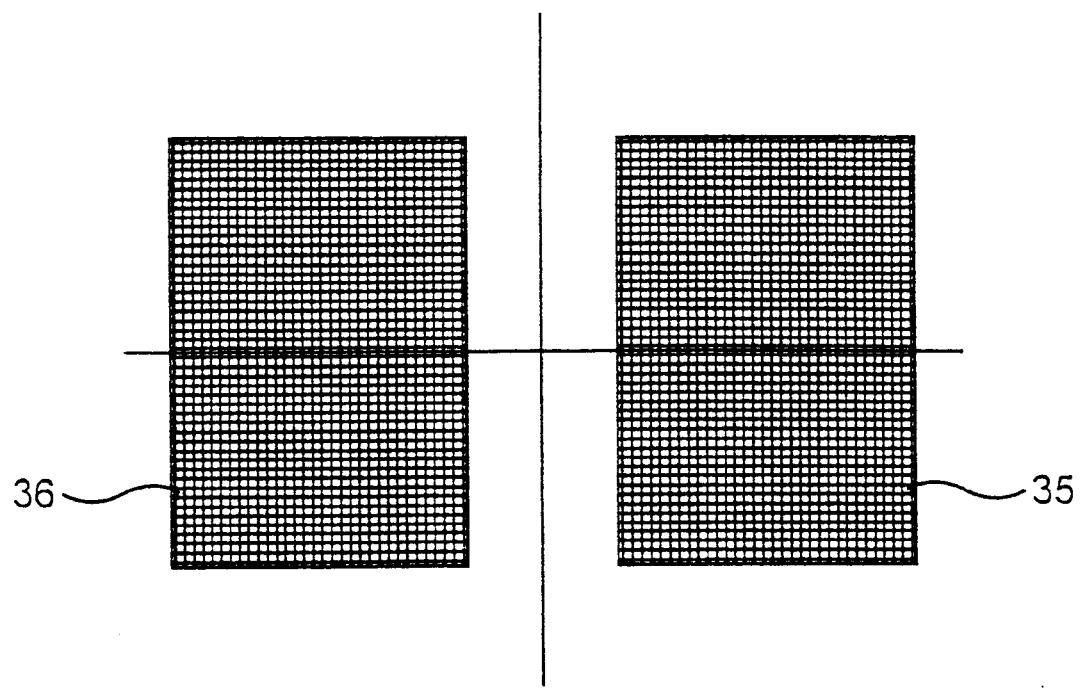
FIG. 3 is a front view of area sensors of the focus detecting optical system of FIG. 1.

Each of the area sensors 35 and 36 is an image sensor in which a great number of pixels are two-dimensionally arranged as shown in FIG. 3 to cover the entire taking area. The area sensors 35 and 36 are arranged along the dividing direction to pick up the secondary images, respectively.

The reducing lens 20 has a refractive power to make an exit pupil of the taking lens 11 be optically conjugate with entrance pupils of the separator lenses 32 and 33. Thus, the separator lenses 32 and 33 forms the secondary images on the area sensors 35 and 36 using light fluxes passed through different portions of the taking lens 11, respectively.

Figure 4:
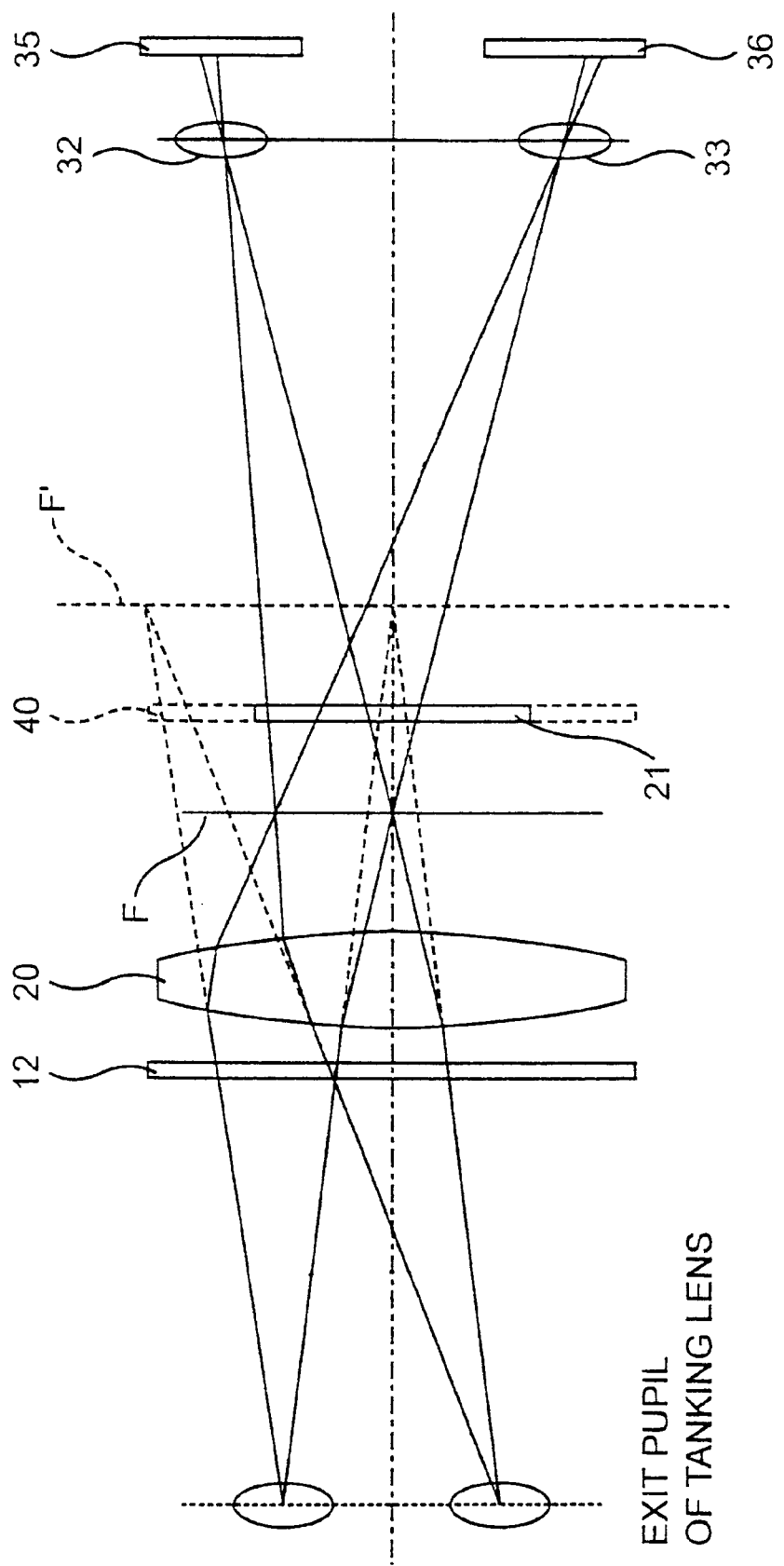
FIG. 4 is a developed view of the optical path in the focus detecting optical system of FIG. 1.
Figure 5:
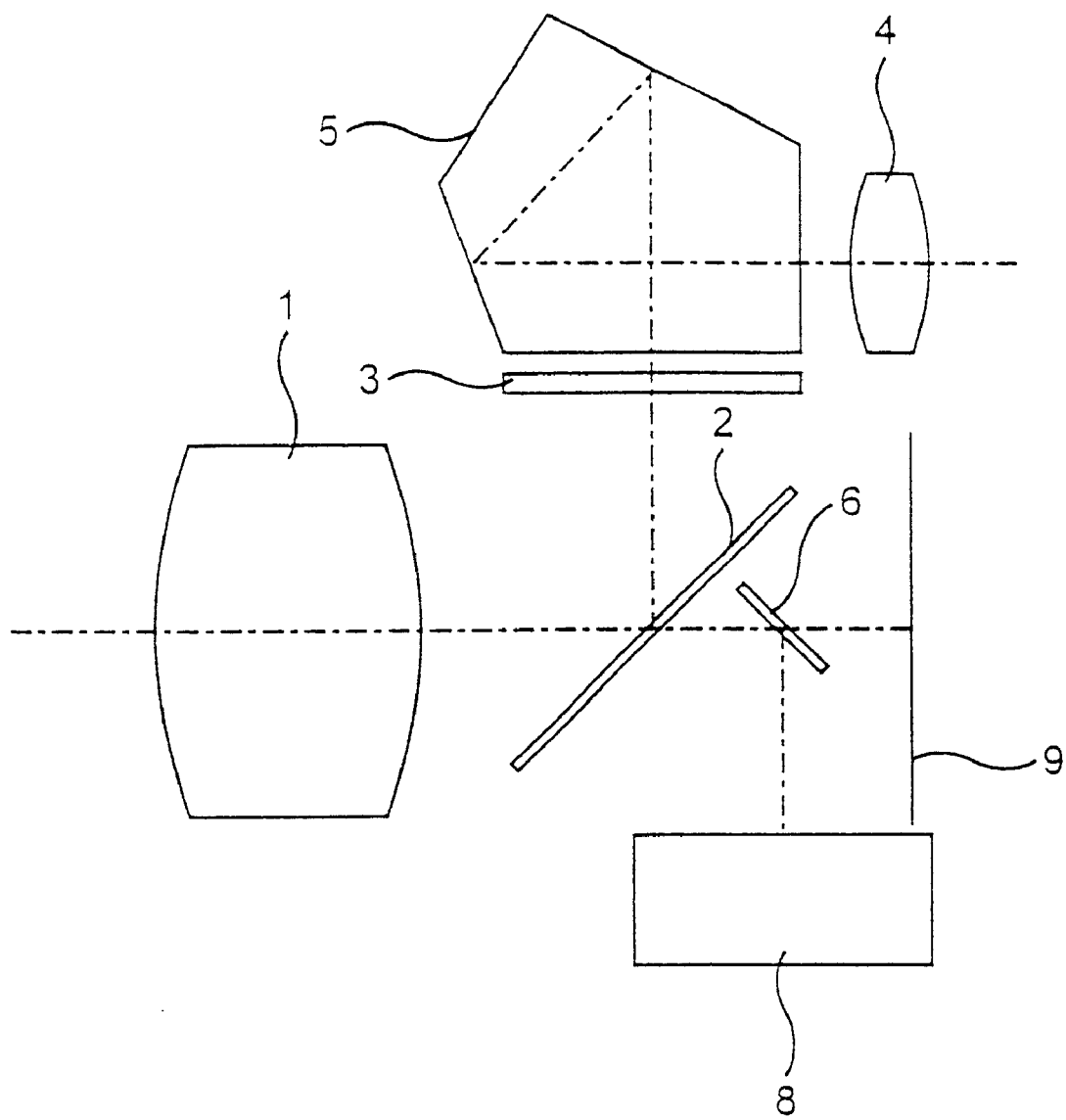
FIG. 5 shows an optical system of a conventional single lens reflex camera.
Figure 6:
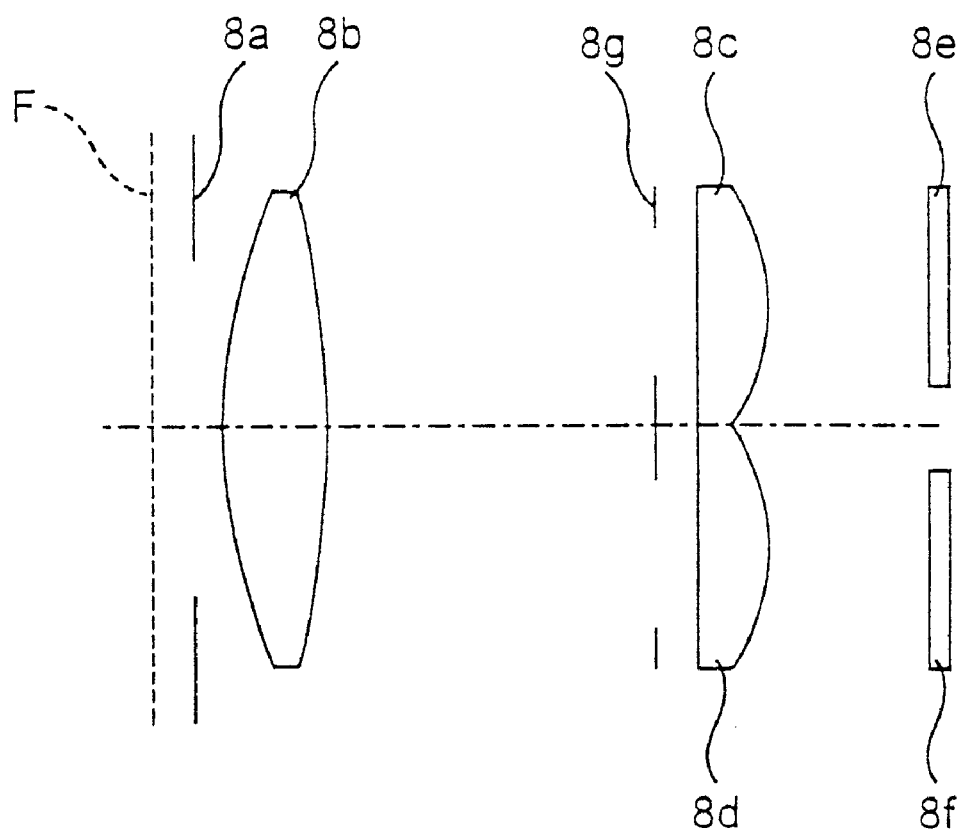
FIG. 6 shows an optical system of a conventional focus detecting unit in the single lens reflex camera of FIG. 5.

FIG. 4 is a developed view of the optical path from the main mirror 12 to the area sensors 35 and 36. If the reduction lens 20 is not provided, the light passed through the half mirror portion of the main mirror 12 travels along a path shown by the dashed line and forms the primary image on the virtual equivalent film plane F' that is also shown by the dashed line. In such a case, a large size sub mirror 40 is required to reflect the necessary light to the focus detecting unit 30, and the optical elements in the unit becomes larger than that of the embodiment.

Actually, the light is converged by the reduction lens 20 and the light travels along a path shown by a solid line, which reduces the size of the separation plane mirror 21 as compared with the virtual sub mirror 40. Further, since the separation plane mirror 21 is used to reflect the light, it does not cause the distortions in the secondary images.

Still further, the equivalent film plane F is positioned closer to the reduction lens 20 than the virtual equivalent film plane F'. This is equivalent to increase the object distance for the separator lenses 32 and 33, which allows settings of long focal length (low refractive power) for the separator lenses 32 and 33, reducing aberrations. This causes satisfactory imaging performance for the secondary images formed on the area sensors 35 and 36 with the accurate focus detection.

The positional relationship between the images formed on the area sensors 35 and 36 varies in accordance with the focusing condition of the taking lens 11 with respect to the subject. When the primary image is formed at the side of the taking lens 11 with respect to the film 16, the corresponding secondary images get closer to each other along the division direction with reference to the positional relationship of the secondary images at the in-focus condition. At the in-focus condition, the primary image is coincident with the film 16. On the contrary, when the primary image is formed at the opposite side to the taking lens 11 with the film 16 between, the distance between the corresponding secondary images becomes larger than that at the in-focus condition.

The microcomputer 38 calculates to compare image data from the pixels in a specific area of the area sensor 35 with image data from the pixels in a corresponding area of the area sensor 36 to detect the focusing condition of the taking lens 11 with respect to the intended subject.

Then the microcomputer 38 controls the focusing mechanism 39 to drive the focusing lens group of the taking lens 11 according to the result of the calculation to move the focusing lens group to the in-focus position.

The subject to be focused may be selected by the user, or the closest subject in the taking area may be automatically selected to be focused by the camera. When the user selects the subject to be focused, the selection of the subject to be focused is not limited to a manual operation using a lever, a dial or the like, but an automatic operation can be also used. For the automatic operation, the camera may be provided with a device for detecting a direction of a visual axis of a user and the camera may determine that the subject located on the visual axis is the subject to be focused.

Further, the image sensor may be constructed of a plurality of line sensors that are arranged in parallel at predetermined intervals. The line sensors have pixels that are linearly arranged along the dividing direction of the separator lenses.

Still further, a pair of line sensors, which cover the entire area in a specific direction in the taking area, may be used as image sensors. In such a case, the focusing condition is detected by calculating to compare image data of a specific area of one line sensor with image data of the corresponding area of the other line sensor. This enables focus detection for any subject in the specific direction. The presence of the reduction lens 20 is effective to reduces the size of the focus detecting optical system even when a pair of the line sensors are used as image sensors as described.

The present disclosure relates to the subject matter contained in Japanese Patent Application No. HEI 10-350386, filed on Dec. 9, 1998, which is expressly incorporated herein by reference in its entirety.

What is claimed is:

1. A focus detecting optical system comprising:

a reduction lens having a positive refractive power, said reduction lens being located between an objective lens and an image taking plane, a primary image of a subject being formed by said objective lens on the image taking plane, the optical axis of said reduction lens being coaxial with the optical axis of said objective lens;

a separation plane mirror that separates light passed through said reduction lens from an optical path extending toward said image taking plane;

a pair of separator lenses that re-form an image formed through said reduction lens and said separation plane mirror into a pair of secondary images;

a pair of image sensors that capture said secondary images; wherein said reduction lens has a refractive power to make an exit pupil of said objective lens be optically conjugate with entrance pupils of said separator lenses.

2. The focus detecting optical system according to claim 1, wherein said image sensors are area sensors in which pixels are two-dimensionally arranged.

3. The focus detecting optical system according to claim 2, wherein each of said area sensors consists of a plurality of line sensors whose pixels are linearly arranged, said line sensors are arranged in parallel at predetermined intervals.

4. The focus detecting optical system according to claim 1, wherein said objective lens is a taking lens of a single lens reflex camera, and wherein said reduction lens is located on the side of said image taking plane with respect to a main mirror that reflects light through said taking lens toward a finder optical system.

* * * * *